(12) United States Patent
Woodward et al.

(10) Patent No.: US 12,240,959 B2
(45) Date of Patent: Mar. 4, 2025

(54) FLAME RETARDANT AND PREPARATION PROCESS THEREOF

(71) Applicant: RHODIA OPERATIONS, Aubervilliers (FR)

(72) Inventors: Gary Woodward, Northwich (GB); Junli Li, Shanghai (CN); Yong Yang, Shanghai (CN)

(73) Assignee: ENERGY SOLUTIONS (US) LLC, Princeton, NJ (US)

( * ) Notice: Subject to any disclaimer, the term of this patent is extended or adjusted under 35 U.S.C. 154(b) by 840 days.

(21) Appl. No.: 17/292,815

(22) PCT Filed: Nov. 14, 2018

(86) PCT No.: PCT/CN2018/115409
§ 371 (c)(1),
(2) Date: May 11, 2021

(87) PCT Pub. No.: WO2020/097825
PCT Pub. Date: May 22, 2020

(65) Prior Publication Data
US 2021/0395484 A1    Dec. 23, 2021

(51) Int. Cl.
C08K 5/00    (2006.01)
C08K 5/52    (2006.01)
C08L 77/06   (2006.01)

(52) U.S. Cl.
CPC .......... C08K 5/0066 (2013.01); C08K 5/5205 (2013.01); C08L 77/06 (2013.01)

(58) Field of Classification Search
None
See application file for complete search history.

(56) References Cited

U.S. PATENT DOCUMENTS

| | | | | |
|---|---|---|---|---|
| 3,421,923 | A | * | 1/1969 | Guth .................. D06M 15/431 427/337 |
| 4,099,913 | A | * | 7/1978 | Walter ............... D06B 19/0094 252/8.61 |
| 5,135,541 | A | * | 8/1992 | Cole .................... D06M 15/43 8/185 |
| 5,139,531 | A | * | 8/1992 | Cole .................... D06M 15/43 8/185 |
| 6,211,402 | B1 | | 4/2001 | Kleiner |
| 6,255,371 | B1 | | 7/2001 | Schlosser et al. |
| 6,344,158 | B1 | | 2/2002 | Schlosser et al. |

(Continued)

FOREIGN PATENT DOCUMENTS

| | | | |
|---|---|---|---|
| CN | 104311876 A | | 1/2015 |
| CN | 103233360 B | * | 2/2015 |

(Continued)

OTHER PUBLICATIONS

Extended European Search Report issued in European Application No. 18940072.4, dated Sep. 13, 2022 (14 pages).

(Continued)

*Primary Examiner* — Joseph D Anthony
(74) *Attorney, Agent, or Firm* — Osha Bergman Watanabe & Burton LLP (57) ABSTRACT

Provided are a process for preparing a flame retardant, a flame retardant obtained by the process and use of the flame retardant in a polymer composition.

9 Claims, 2 Drawing Sheets

(56) References Cited

U.S. PATENT DOCUMENTS 6,365,071 B1 4/2002 Jenewein et al.
2014/0045399 A1 2/2014 Hensley

FOREIGN PATENT DOCUMENTS

CN 106220682 A 12/2016
WO 2012083318 A1 6/2012

OTHER PUBLICATIONS

Office Action issued in the counterpart Chinese Patent Application No. 201880099523.2, mailed May 7, 2023 (7 pages).
Office Action issued in Korean Application No. 10-2021-7014786; Dated Oct. 9, 2023 (12 pages).

* cited by examiner

FLAME RETARDANT AND PREPARATION PROCESS THEREOF

This application is a U.S. national phase entry under 35 U.S.C. § 371 of International Application No. PCT/CN2018/115409, filed on Nov. 14, 2018. The entire content of this application is explicitly incorporated herein by this reference.

TECHNICAL FIELD

The present invention pertains to a process for preparing a flame retardant and a flame retardant thereof. The present invention also pertains to use of said flame retardant in a polymer composition.

BACKGROUND ART

Flame retardants are used in thermoplastic polymers and other industrial products for inhibiting or resisting the spread of fire. In recent years, the industrial applications of halogen free flame retardants have attracted much attention, due to their environment-friendly advantages brought by the finite halogen level.

One family of commonly used halogen free flame retardants (HFFR) is metal phosphinates plus N-synergist, such as Exolit® OP1230, OP1314 and OP1400 from Clariant Company, which are widely used in thermoplastics. Nevertheless, metal phosphinates plus N-synergists have their own constrains and disadvantages when used in a polyamide system. For instance, they may result in corrosive problem to compounding machines. Also, metal phosphinates plus N-synergists are usually expensive.

Another commonly used halogen free flame retardant (HFFR) is red phosphorus. One problem associated with red phosphorus is that it will produce $PH_3$ which is hazardous to environment. In addition, red phosphorus is susceptible to degradation. Furthermore, it can only appear in red or black color and is therefore not suitable for applications which require the material to be in other colors.

In addition, as the process temperature is very high and normally the compounding temperature is more than 270° C. for glass fiber reinforced polyamide systems, it remains a challenge to provide a flame retardant suitable for use in polyamide systems.

One objective of the present invention is thus to provide a method for preparing a flame retardant which overcomes the aforesaid disadvantages associated with conventional flame retardants, and a flame retardant which offers satisfactory flame retardant properties combined with good thermo stability.

SUMMARY OF INVENTION

In a first aspect, the present application provides a process for preparing a flame retardant, comprising the steps of: (i) providing a reaction product of a Compound (N) with a Compound (P), (ii) adding an oxidant to the reaction product in (i) and reacting the mixture to obtain the flame retardant;

wherein:

the Compound (N) is a compound according to general formula (I) or general formula (II):

$R_1$, $R_2$, and $R_3$ is independently hydrogen, hydroxyl, amino, or mono- or $diC_1$-$C_8$ alkyl amino; or $C_1$-$C_8$ alkyl, $C_5$-$C_{16}$ cycloalkyl, alkylcycloalkyl, each being optionally substituted by a hydroxyl or a $C_1$-$C_4$ hydroxyalkyl, $C_2$-$C_8$ alkenyl, $C_1$-$C_8$ alkoxyl, acyl, acyloxy, $C_6$-$C_{12}$ aryl, —$OR_1$ and —$N(R_1)R_2$; or is N-alicyclic or N-aromatic, where N-alicyclic denotes cyclic nitrogen containing compounds such as pyrrodiline, piperidine, imidazolidine, piperazine, and N-aromatic denotes nitrogen containing heteroaromatic ring compounds such as pyrrole, pyridine, imidazole and pyrazine; provided that at least one of $R_1$, $R_2$, and $R_3$ is an amino group, or a mono- or $diC_1$-$C_8$ alkyl amino group;

a and q is each independently 1, 2, 3 or 4;

X is an acid selected from the group consisting of phosphoric acid, pyrophosphoric acid, cyanuric acid and a $C_6$-$C_{12}$ aromatic carboxylic acid;

the Compound (P) is according to general formula (III):

$R_4$, $R_5$, $R_6$ and $R_7$ is independently a $C_1$-$C_5$ hydroxylalkyl; preferably hydroxymethyl or hydroxyethyl;

Y is an anion, n is valence of Y.

In a second aspect, the present application provides a flame retardant obtained by the above process.

In a third aspect, the present application provides a use of the flame retardant in a polymer composition.

In a fourth aspect, the present application provides a polymer composition comprising a polymer and the flame retardant described herein.

In a fifth aspect, the present application provides a flame retardant obtained from reacting a Compound (N) with a Compound (P); wherein the Compound (N) is a compound according to general formula (I) or general formula (II):

(II)

$R_1$, $R_2$, and $R_3$ is independently hydrogen, hydroxyl, amino, or mono- or $diC_1$-$C_8$ alkyl amino; or $C_1$-$C_8$ alkyl, $C_5$-$C_{16}$ cycloalkyl, alkylcycloalkyl, each being optionally substituted by a hydroxyl or a $C_1$-$C_4$ hydroxyalkyl, $C_2$-$C_8$ alkenyl, $C_1$-$C_8$ alkoxyl, acyl, acyloxy, $C_6$-$C_{12}$ aryl, —$OR_1$ and —$N(R_1)R_2$; or is N-alicyclic or N-aromatic, where N-alicyclic denotes cyclic nitrogen containing compounds such as pyrrodiline, piperidine, imidazolidine, piperazine, and N-aromatic denotes nitrogen containing heteroaromatic ring compounds such as pyrrole, pyridine, imidazole and pyrazine; provided that at least one of $R_1$, $R_2$, and $R_3$ is an amino group, or a mono- or $diC_1$-$C_8$ alkyl amino group; a and q is each independently 1, 2, 3 or 4;

X is an acid selected from the group consisting of phosphoric acid, pyrophosphoric acid, cyanuric acid and a $C_6$-$C_{12}$ aromatic carboxylic acid;

the Compound (P) is according to general formula (III):

(III)

$R_4$, $R_5$, $R_6$ and $R_7$ is independently a $C_1$-$C_5$ hydroxylalkyl; preferably hydroxymethyl or hydroxyethyl;

Y is an anion, n is valence of Y, wherein the flame retardant exhibits a peak of a $^{31}P$ solid NMR spectrum in the range of 1 to 100 ppm, and peak area of said peak is 70% to 100% of the total peak area of all peaks measured in $^{31}P$ solid NMR spectrum.

BRIEF DESCRIPTION OF THE DRAWINGS

While the specification concludes with claims that particularly point out and distinctly claim the invention, it is believed the present invention will be better understood from the following description of the accompanying figures.

DETAILED DESCRIPTION

Throughout the description, including the claims, the term "comprising one" or "comprising a" should be understood as being synonymous with the term "comprising at least one", unless otherwise specified, and "between" should be understood as being inclusive of the limits.

It should be noted that in specifying any range of concentration, weight ratio or amount, any particular upper concentration, weight ratio or amount can be associated with any particular lower concentration, weight ratio or amount, respectively.

The articles "a", "an" and "the" are used to refer to one or to more than one (i.e., to at least one) of the grammatical object of the article.

The term "and/or" includes the meanings "and", "or" and also all the other possible combinations of the elements connected to this term.

As used herein, the term "flame retardant" encompasses full compositions of flame retardants, as well as agents having flame retardant functionality.

As used herein, the terminology "(Cn-Cm)" in reference to an organic group, wherein n and m are each integers, indicates that the group may contain from n carbon atoms to m carbon atoms per group.

As used herein, the term "alkyl" means a saturated hydrocarbon radical, which may be straight or branched, such as methyl, ethyl, n-propyl, iso-propyl, n-butyl, sec-butyl, t-butyl, pentyl and n-hexyl.

As used herein, the term "cycloalkyl" means a saturated hydrocarbon radical that includes one or more cyclic alkyl rings, such as cyclopentyl, cyclooctyl, and adamantanyl.

As used herein, the term "alkenyl" means an unsaturated straight chain, branched chain, or cyclic hydrocarbon radical that contains one or more carbon-carbon double bonds, such as ethenyl, 1-propenyl, 2-propenyl.

As used herein, the term "aryl" means a monovalent unsaturated hydrocarbon radical containing one or more six-membered carbon rings in which the unsaturation may be represented by three conjugated double bonds, which may be substituted one or more of carbons of the ring with hydroxy, alkyl, alkenyl, halo, haloalkyl, or amino, such as phenoxy, phenyl, methylphenyl, dimethylphenyl, trimethylphenyl, chlorophenyl, trichloromethylphenyl, and aminophenyl.

As used herein, the term "hydroxyalkyl" means an alkyl radical that is substituted with a hydroxyl group, such as hydroxymethyl, hydroxyethyl, hydroxypropyl, and hydroxydecyl. The term "hydroxylalkenyl" shall be understood in similar manner.

As used herein, the term "alkyl amino" means a group or radical containing both an alkyl and an amino group.

As used herein, the term "alkoxyl" means an univalent group —RO (such as methoxyl) composed of an alkyl group united with oxygen.

As used herein, the term "acyl" means a group of general formula —C(O)—R, where R is an alkyl group, derived from a carboxylic acid.

As used herein, the term "acyloxy" means a radical R—CO—, derived from an organic acid, wherein R is any organic group.

The present application provides a process for preparing a flame retardant, comprising the steps of: (i) providing a reaction product of Compound (N) with a Compound (P), (ii) adding an oxidant to the reaction mixture in (i) and reacting the mixture to obtain the flame retardant;

wherein:

the Compound (N) is a compound according to general formula (I) or general formula (II):

(I)

(II)

$R_1$, $R_2$, and $R_3$ is independently hydrogen, hydroxyl, amino, or mono- or di$C_1$-$C_8$ alkyl amino; or $C_1$-$C_8$ alkyl, $C_5$-$C_{16}$ cycloalkyl, alkylcycloalkyl, each being optionally substituted by a hydroxyl or a $C_1$-$C_4$ hydroxyalkyl, $C_2$-$C_8$ alkenyl, $C_1$-$C_8$ alkoxyl, acyl, acyloxy, $C_6$-$C_{12}$ aryl, —$OR_1$ and —$N(R_1)R_2$; or is N-alicyclic or N-aromatic, where N-alicyclic denotes cyclic nitrogen containing compounds such as pyrrodiline, piperidine, imidazolidine, piperazine, and N-aromatic denotes nitrogen containing heteroaromatic ring compounds such as pyrrole, pyridine, imidazole and pyrazine; provided that at least one of $R_1$, $R_2$, and $R_3$ is an amino group, or a mono- or di$C_1$-$C_8$ alkyl amino group;

a and q is each independently 1, 2, 3 or 4;

X is an acid selected from the group consisting of phosphoric acid, pyrophosphoric acid, cyanuric acid and a $C_6$-$C_{12}$ aromatic carboxylic acid;

the Compound (P) is according to general formula (III):

(III)

$R_4$, $R_5$, $R_6$ and $R_7$ is independently a $C_1$-$C_5$ hydroxylalkyl; preferably hydroxymethyl or hydroxyethyl;

Y is an anion, n is valence of Y.

According to every one of the invention embodiments, the Compound (N) is preferably a compound according to general formula (I) described above.

According to every one of the invention embodiments, the Compound (P) is preferably according to general formula (IV):

(IV)

wherein Y is an anion, n is valence of Y.

In general formula (III) or (IV) for the Compound (P), Y is an anion including and not limited to: a halide anion such as $Cl^-$ and $Br^-$, and $SO_4^{2-}$, $NO_3^-$, $PO_4^{3-}$, $H_2PO_2^-$, $HPO_3^{2-}$, $RCOOH^-$ wherein R is an alkyl, hydroxyalkyl, alkenyl or hydroxylalkenyl. Preferably, Y is $Cl^-$, $Br^-$, $SO_4^{2-}$, $NO_3^-$, $PO_4^{3-}$, $H_2PO_2^-$, or $HPO_3^{2-}$.

The applicant has surprisingly found that, by the aforementioned process, a flame retardant can be produced which offers excellent flame retardant properties and good thermo stability.

Suitable Compound (N) may be selected from the group consisting of: melamine, melamine cyanurate, melamine phosphate compounds, dimelamine phosphate compounds, melamine pyrophosphate compounds, melem, melam, melon, ammeline, ammelide and a mixture thereof.

In a preferred embodiment, the Compound (N) is melamine. The term "melamine" used herein refers to a compound of the formula (V):

(V)

Preferably, the Compound (P) is bis[tetrakis(hydroxymethyl) phosphonium]sulfate (THPS), tetrakis(hydroxymethyl)phosphonium Chloride (THPC), or a mixture thereof.

The reaction product in the step (i) is notably obtained by reacting the Compound (N) with Compound (P). The molar ratio of the Compound (N) to the Compound (P) may be from 1:5 to 5:1, preferably, from 1:3 to 3:1, more preferably, from 1:2 to 2:1.

In the step (i), the reaction may be carried out at a temperature between 25° C. and 120° C., preferably between 65° C. and 120° C., more preferably between 70° C. and 100° C. The reaction time can vary from 15 minutes to 8 hours, preferably from 30 minutes to 5 hours, more preferably from 1 to 4 hours, more preferably from 2 to 3 hours.

Preferably, step (i) is conducted in absence of any catalysts.

Preferably, the reactants in step (i) are refluxed.

In the step (ii), the oxidant may be selected from $H_2O_2$, oxygen, pyrosulfite salts such as sodium pyrosulfite ($Na_2S_2O_5$), persulphate salts such as sodium persulfate, potassium persulfate, ammonium persulphate, and peroxodisulfate salts such as disodium peroxodisulfate. The oxidant may also be an organic peroxide, such as hydroperoxide, peroxy acid and ester, diacyl peroxide and dialkylperoxide. Preferably the oxidant is $H_2O_2$.

In the step (ii), after the oxidant is added, the mixture may be reacted under a temperature between 25° C. and 120° C., preferably between 65° C. and 120° C., more preferably between 70° C. and 100° C. The reaction time can vary from 15 minutes to 8 hours, preferably from 30 minutes to 5 hours, more preferably from 1 to 4 hours, more preferably 2 to 3 hours.

Preferably, the reactants in step (ii) are refluxed.

Preferably, the reactions are conducted under a pH of 3 or above.

Preferably, the flame retardant obtained in the step (ii) may be subject to one or more additional steps, such as:

(iii) cooling and filtering the reaction product in (ii) to obtain a solid product; typically, the flame retardant is cooled to a temperature of 10° C. to 50° C., preferably, 15° C. to 40° C., more preferably 20° C. to 30° C.;

(iv) washing and drying the solid product in (iii), typically, the solid product is washed with water and dried in a drying oven at 100° C. to 250° C.

In another aspect of the invention, the present invention is directed to a flame retardant obtained by the process described herein.

In still another aspect of the invention, the present invention is directed to a flame retardant obtained from reacting a Compound (N) with a Compound (P), the Compound (N) is a compound according to general formula (I) or general formula (II):

(I)

(II)

$R_1$, $R_2$, and $R_3$ is independently hydrogen, hydroxyl, amino, or mono- or di$C_1$-$C_8$ alkyl amino; or $C_1$-$C_8$ alkyl, $C_5$-$C_{16}$ cycloalkyl, alkylcycloalkyl, each being optionally substituted by a hydroxyl or a $C_1$-$C_4$ hydroxyalkyl, $C_2$-$C_8$ alkenyl, $C_1$-$C_8$ alkoxyl, acyl, acyloxy, $C_6$-$C_{12}$ aryl, —$OR_1$ and —$N(R_1)R_2$; or is N-alicyclic or N-aromatic, where N-alicyclic denotes cyclic nitrogen containing compounds such as pyrrodiline, piperidine, imidazolidine, piperazine, and N-aromatic denotes nitrogen containing heteroaromatic ring compounds such as pyrrole, pyridine, imidazole and pyrazine; provided that at least one of $R_1$, $R_2$, and $R_3$ is an amino group, or a mono- or di$C_1$-$C_8$ alkyl amino group;

a and q is each independently 1, 2, 3 or 4;

X is an acid selected from the group consisting of phosphoric acid, pyrophosphoric acid, cyanuric acid and a $C_6$-$C_{12}$ aromatic carboxylic acid;

the Compound (P) is according to general formula (III):

(III)

$R_4$, $R_5$, $R_6$ and $R_7$ is independently a $C_1$-$C_5$ hydroxylalkyl; preferably hydroxymethyl or hydroxyethyl;

Y is an anion, n is valence of Y;

wherein the flame retardant exhibits a peak of a $^{31}$P solid NMR spectrum in the range of 1 to 100 ppm and peak area of said peak is 70% to 100% of the total peak area of all peaks measured in $^{31}$P solid NMR spectrum.

In some embodiments, the present invention is directed to a flame retardant obtained from reacting a Compound (N) with a Compound (P), the Compound (N) is a compound according to general formula (I) or general formula (II):

(I)

(II)

$R_1$, $R_2$, and $R_3$ is independently hydrogen, hydroxyl, amino, or mono- or di$C_1$-$C_8$ alkyl amino; or $C_1$-$C_8$ alkyl, $C_5$-$C_{16}$ cycloalkyl, alkylcycloalkyl, each being optionally substituted by a hydroxyl or a $C_1$-$C_4$ hydroxyalkyl, $C_2$-$C_8$ alkenyl, $C_1$-$C_8$ alkoxyl, acyl, acyloxy, $C_6$-$C_{12}$ aryl, —$OR_1$ and —$N(R_1)R_2$; or is N-alicyclic or N-aromatic, where N-alicyclic denotes cyclic nitrogen containing compounds such as pyrrodiline, piperidine, imidazolidine, piperazine, and N-aromatic denotes nitrogen containing heteroaromatic ring compounds such as pyrrole, pyridine, imidazole and pyrazine; provided that at least one of $R_1$, $R_2$, and $R_3$ is an amino group, or a mono- or di$C_1$-$C_8$ alkyl amino group;

a and q is each independently 1, 2, 3 or 4;

X is an acid selected from the group consisting of phosphoric acid, pyrophosphoric acid, cyanuric acid and a $C_6$-$C_{12}$ aromatic carboxylic acid;

the Compound (P) is according to general formula (IV):

(IV)

wherein Y is an anion, n is valence of Y;

wherein the flame retardant exhibits a peak of a $^{31}$P solid NMR spectrum in the range of 1 to 100 ppm and peak area of said peak is 70% to 100% of the total peak area of all peaks measured in $^{31}$P solid NMR spectrum.

In some embodiments, said Compound (N) is selected from the group consisting of: melamine, melamine cyanurate, melamine phosphate compounds, dimelamine phosphate compounds, melamine pyrophosphate compounds, melem, melam, melon, ammeline, ammelide and a mixture thereof; in particular, said Compound (N) is melamine.

In some embodiments, said Compound (P) is bis[tetrakis (hydroxymethyl)phosphonium]sulfate (THPS), tetrakis(hydroxymethyl)phosphonium Chloride (THPC), or a mixture thereof.

Without wishing to be bound by theory, it is believed that in the flame retardant of the invention, the phosphorus element is substantially present in a stable tertiary phosphine oxide state, which contributes to the good thermal stability and/or excellent flame retardant properties of the flame retardant.

Notably, the flame retardant has a Thermogravimetric Analysis (TGA) weight loss of less than 3 wt % at 330° C., the TGA weight loss being measured at a heating rate of 10° C./min under a nitrogen air flow of 100 mL/min.

Typically, the phosphorous and nitrogen elements are present in the flame retardant in the ranges of 5-20 wt % (phosphorous) and 25-50 wt % (nitrogen), respectively, based on the total weight of the flame retardant.

In yet another aspect of the present invention, the present invention is directed to use of the flame retardant as described herein in a polymer composition.

In yet another aspect of the present invention, there is provided a polymer composition [Composition (Q)] comprising a polymer and the flame retardant as described herein.

Typically, the polymer suitable for the invention include but are not limited to: polyphenylene ethers; polyamides (PA) such as PA66, PA6, PA610, high-temperature polyamides such as PPA, PA4.6, PA9T, PA66.6T, PA10T and PA6.6T; polyesters; polycarbonates; epoxy resins; phenolic resins; acrylonitrile butadiene styrene (ABS); polypropylene; high-density polyethylene (HDPE); low-density polyethylene (LDPE); linear low-density polyethylene (LLDPE); polyketone resins; styrene acrilonitrile (SAN); styrene butadiene rubbers and lattices (SBR and SB); halogenated polymers such as polyvinylchloride (PVC); expandable polystyrenes (EPS); and polybutylene terephthalates (PBT) including glass fiber reinforced PBT.

The polymer may also be a mixture of polymers, such as PA/PET, PA/ABS and PA/PP, mixture of high impact polystyrene (HIPS) and polyphenylene ether, such as PPO/HIPS.

In a preferred embodiment, the polymer is selected from polyamides (PA), polybutylene terephthalates (PBT) and polyketone resins.

In another preferred embodiment, the polymer is a glass fiber reinforced polybutylene terephthalates (PBT).

The Composition (Q) may further comprise one or more additional flame retardant additives, which could enhance its flame retardancy properties such as endothermic degradation, thermal shielding, dilution of gas phase, dilution of combustible portion, and radical quenching.

The additional flame retardant additive in the Composition (Q) are notably described in U.S. Pat. Nos. 6,344,158, 6,365,071, 6,211,402 and 6,255,371.

Preferably, the additional flame retardant additives may be selected from:

A) phosphorous containing flame retardant additives, such asphosphine oxides, phosphonic acids and their salts, phosphinic acids and their salts such as aluminium or zinc salts of diethylphosphinic acid and aluminium or zinc salts of dimethylphosphinic acid, cyclic phosphonates, organic phosphates, inorganic phosphates, and red phosphorous which may be provided under several shapes such as stabilized, coated, and as a powder;

B) nitrogen containing flame retardant additives, such as: triazines, cyanuric acid and/or isocyanuric acid, melamine or its derivatives such as cyanurate, oxalate, phtalate, borate, sulfate, phosphate, polyphosphate and/or pyrophosphate, condensed products of melamine such as melem, melam, melon, tris(hydroxyethyl) isocyanurate, benzoguanamine, guanidine, allantoine and glycoluril;

C) halogen containing flame retardant additives, such as:
bromine containing flame retardant additives, such as polybromodiphenyl oxydes (PBDPO), brominated polystyrene (BrPS), poly(pentabromobenzylacrylate), brominated indane, tetradecabromodiphenoxybenzene (Saytex 120), ethane-1,2-bis(pentabromophenyl) or Saytex 8010 of Albemarle, tetrabromobisphenol A and brominated epoxy oligomers. Notably can be used the following compounds: PDBS-80 from Chemtura, Saytex HP 3010 from Albemarle or FR-803P from Dea Sea Bromine Group, FR-1210 from Dea Sea Bromine Group, octabromodiphenylether (OBPE), FR-245 from Dead Sea Bromine Group, FR-1025 from Dead Sea Bromine Group and F-2300 or F2400 from Dead Sea Bromine Group; and chlorine containing flame retardant additives, such as Dechlorane Plus® from OxyChem (CAS 13560-89-9); and D) inorganic flame retardant additives, such as antimony trioxide, aluminium hydroxide, magnesium hydroxide, cerium oxide, boron containing compounds such as calcium borate.

These flame retardant additives may be used alone or in combination in the Composition (Q). Charring agents and charring catalysts may also be added if necessary.

In some embodiments, the Composition (Q) comprises a polymer, the flame retardant described herein and an additional flame retardant additive is selected from aluminium salt of diethylphosphinic acid, aluminium salt of dimethylphosphinic acid, zinc salt of dimethylphosphinic acid, and a combination thereof. The Composition (Q) may further comprise fillers and reinforcing materials and/or other additives, such as lubricants (e.g. stearic acid or stearate salts such as calcium stearate), glass fibers, or antidriping agents such as poly(tetrafluoroethylene), e.g. PTFE SN3306.

The Composition (Q) may also comprise additives normally used for the manufacture of polymer compositions, such as plasticizers, nucleating agents, catalysts, light and/or thermal stabilizers, antioxidants, co-stabilizers, antistatic agents, colorants, pigments, matting agents, conductive agents such as carbon black, molding additives.

For the preparation of the Composition (Q), the fillers and additives may be added by any conventional means, e.g. during the polymerization or as a molten mixture. Preferably, the additives are added to the polymer in a melt process, such as during a melt extrusion step. Alternatively, the additives can be added to the polymer in a solid process, in a mechanical mixer, to produce a solid mixture that is subsequently melted, for example by extrusion process.

The Composition (Q) may be used as raw material in the field of plastics processing, such as for the preparation of articles formed by injection molding, by injection/blow-molding, by extrusion or by extrusion/blow-molding. According to one customary embodiment, the Composition (Q) is extruded in the form of rods, for example in a twin-screw extrusion device, said rods then being chopped into granules. The molded components are then prepared by melting the granules produced above and feeding the molten composition into injection-molding devices.

The present invention also relates to an article comprising the flame retardant or the Composition (Q) as described herein. Said articles may be vehicle parts such as tubes, tanks, bodywork components, or components under the engine hood, as well as articles for the electrical and electronics applications, such as connecters.

The present invention will be further illustrated with reference to the following examples.

EXAMPLES

Materials
PA 66-26A: an aliphatic polyamide resin from Solvay Company;
PBT 1200-211 M: a polybutylene terephthalate resin from Taiwan Changchun Ltd.;
Exolit® OP1230: aluminium phosphinate from Clariant Company;
Amgard® PA1: melamine derivative mixture obtained from Solvay Company;

THPS: bis[tetrakis(hydroxymethyl)phosphonium]sulfate from Solvay Company;
MEA: melamine from Solvay Company;
Irganox® 1098: an antioxidant from BASF Company;
LCA: calcium stearate; lubricant;
EBS: N,N'-Ethylenebis(stearamide); lubricant;
Glass Fiber(301): ECS301CL glass fiber from Chongqing Polycomp International Corp.;
Glass Fiber JUSHI 534A: glass fiber from Jushi Company;
PBT 1200-211 M: PBT resin from Taiwan Changchun Ltd.

Methods $^{31}$P MAS NMR tests: NMR was performed on an Agilent 600 DD2 spectrometre at a resonance frequency of 242.76 MHz. $^{31}$P NMR dipolar-decoupling magic-angle spinning (DD/MAS) spectra was recorded with spinning rate of 15 kHz with a 4 mm probe at room temperature. DD/MAS experiments were performed with a delay time of 3 secs, (CH$_3$O)$_3$PO as the reference. Scan number: 1024 scans.

Thermogravimetric Analysis (TGA) weight loss tests: TGA weight loss was measured at a heating rate of 10° C./min under a nitrogen air flow of 100 mL/min, using a SDT Q600 equipment (from TA Instruments). Samples of about 10 mg were analyzed in opened alumina pans.

Example 1

Figure 1:
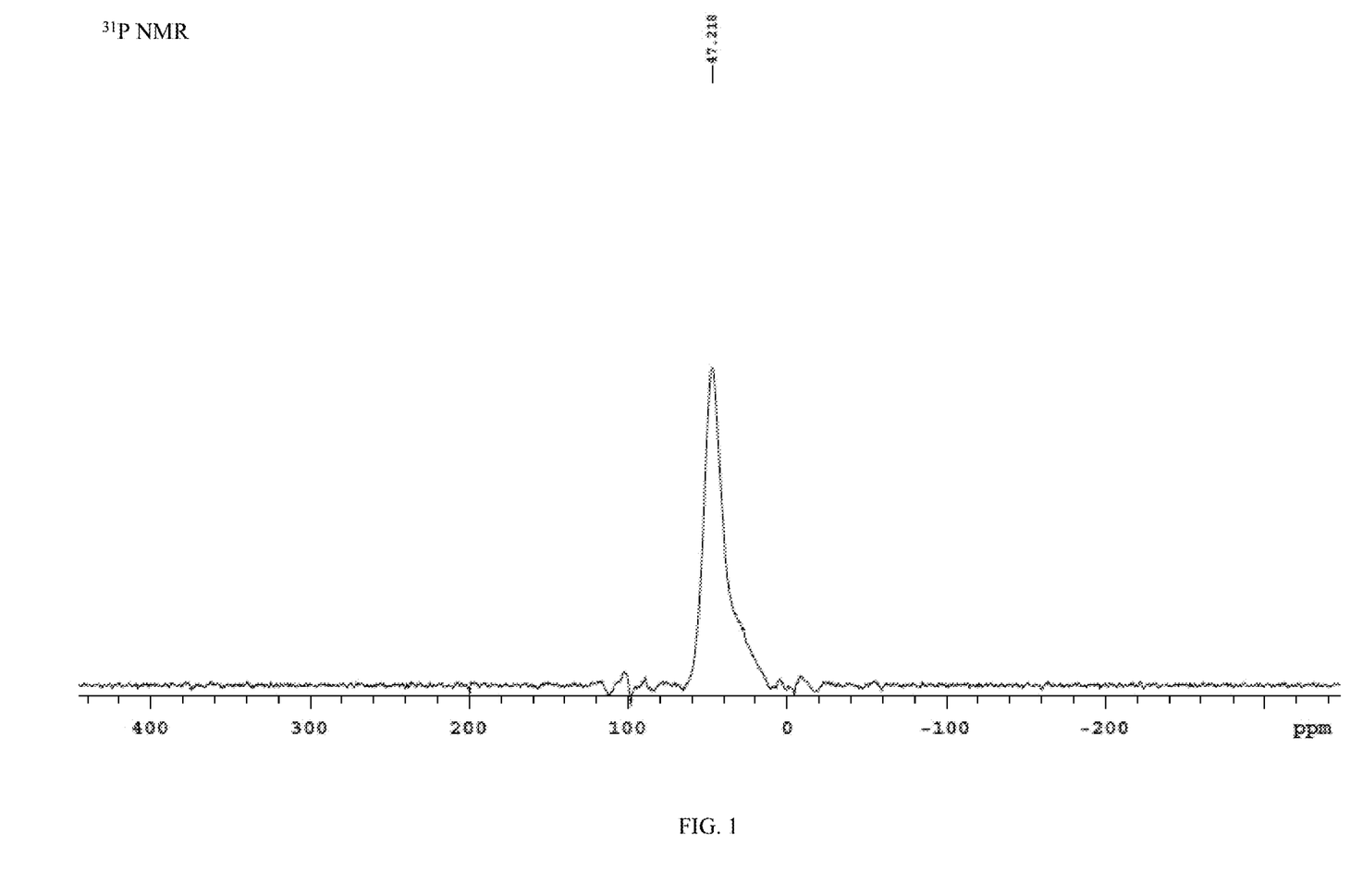
FIG. 1 shows $^{31}P$ NMR spectrum of the flame retardant prepared in Example 1.

Under N$_2$ flow, 304.8 g THPS were charged into 1 L three-necked flask equipped with a thermometer, a mechanical stirrer and a reflux condenser at room temperature, then 50 g melamine were added to 300 ml water to form a cloudy solution, which was charged into the flask. Then the mixture solution was heated to 70° C. and reacted for 2 hours. Subsequently, the solution was cooled down to 40° C. 127.5 g H$_2$O$_2$ in aqueous solution were added into the mixture dropwise, and then the mixture was continuously reacted for 2 hours at 80° C. After that, the solution was cooled, filtered and the white solid particles was washed three times with water, and then dried at 105° C. to 250° C. in a drying oven. Finally, 106.5 g white solid particles were obtained. The P % and N % of the final sample (ICP method for P measurement, Elemental analysis for N measurement) is 10.63 wt % and 26.13 wt %, respectively. The solid $^{31}$P NMR result of the sample is showed in FIG. 1. In $^{31}$P NMR spectrum, one peak appeared around 47.2 ppm, which should be attributed to presence of tertiary phosphine oxide.

Example 2

Under N$_2$ flow, 215 g THPS were charged into 1 L three-necked flask equipped with a thermometer, a mechanical stirrer and a reflux condenser at room temperature, then 100 g melamine was added to 300 ml water to form a cloudy solution, which was charged into the flask. Then the mixture solution was heated to 100° C. and reacted for 3 hours. Subsequently, the mixture solution was cool down to 40° C. 90 g H$_2$O$_2$ in aqueous solution were added into the mixture dropwise, and then was continuously reacted for 2 hours at 80° C., After that, the solution was cooled, filtered and the resulting white solid particles were washed three times with water, and then dried at 105° C. to 250° C. in a drying oven. Finally, 176 g white solid particles were obtained. The P % and N % of the final sample is 10.25 wt % and 34.52 wt %, respectively. The solid $^{31}$P NMR spectrum of the sample was substantially the same as that shown in FIG. 1.

Example 3

Under N$_2$, 429 g THPS were charged into 2 L three-necked flask equipped with a thermometer, a mechanical stirrer and a reflux condenser at room temperature, then 200 g melamine were added to 700 ml water to form a cloudy solution, which was charged into the flask. The mixture solution was heated to 100° C. and reacted for 2 hours. Subsequently, the mixture solution was cool down to 40° C. 180 g H$_2$O$_2$ in aqueous solution were added into the mixture dropwise, and then the mixture was continuously reacted for 2 hours at 80° C. After that, the solution was cooled, filtered and the resulting white solid particles were washed three times with water, and then dried at 105° C. to 250° C. in a drying oven. Finally, 350 g white solid particles were obtained. The P % and N % of the final sample was 10.64 wt % and 31.66 wt %, respectively. The solid $^{31}$P NMR result of the sample was substantially the same as the one shown in FIG. 1.

Comparative Example 1

Figure 2:
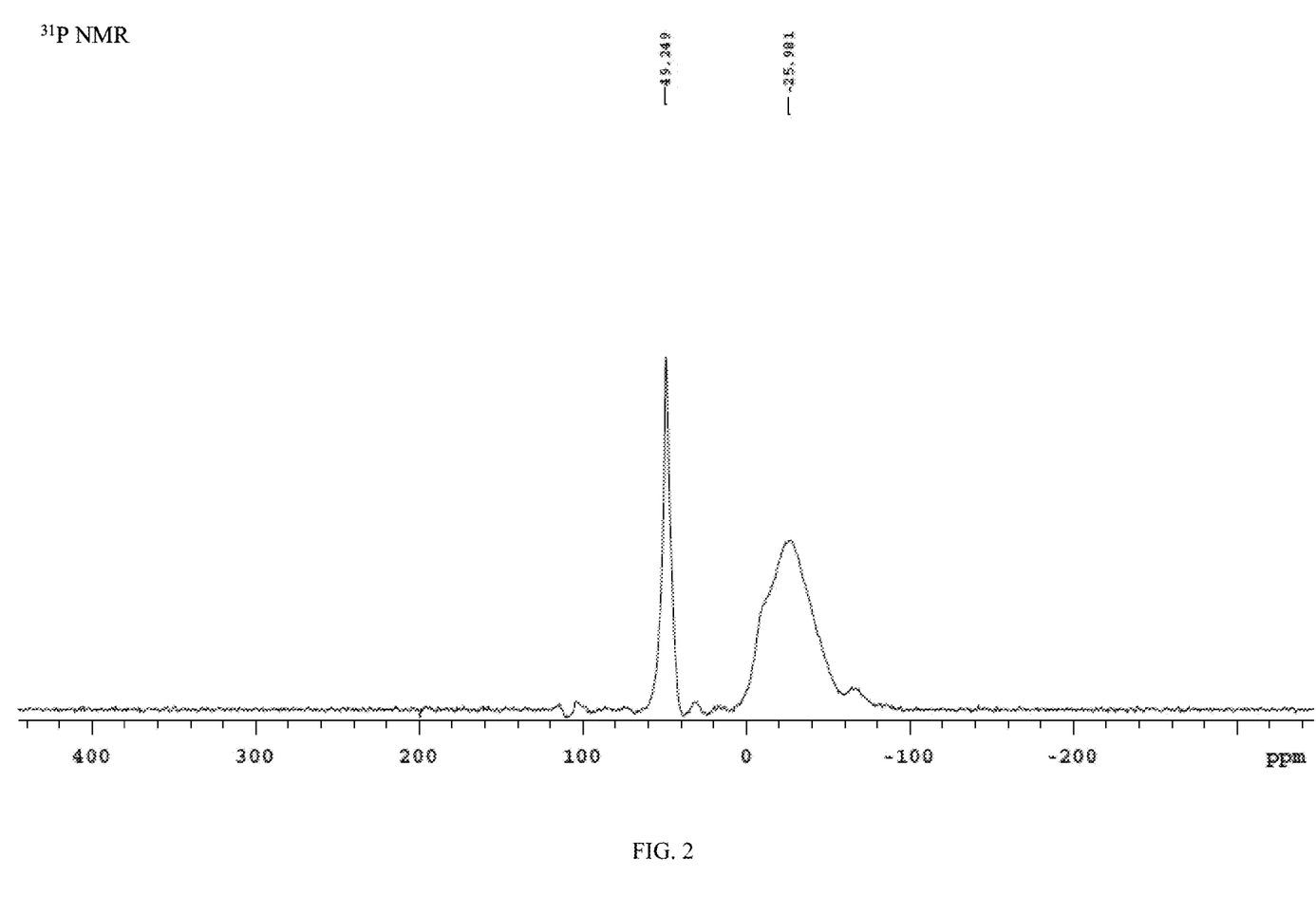
FIG. 2 shows $^{31}P$ NMR spectrum of the flame retardant prepared in Comparative Example 1.

Under N$_2$ flow, 304.8 g THPS were charged into 1 L three-necked flask equipped with a thermometer, a mechanical stirrer and a reflux condenser at room temperature, then 50 g melamine were added to 300 ml water to form a cloudy solution, which was charged into the flask. Then the mixture solution was heated to 70° C. and reacted for 2 hours. Subsequently, the solution was cooled, filtered and the white solid particles was washed three times with water, and then dried at 105° C. to 250° C. in a drying oven. Finally, 134 g white solid particles were obtained. The P % and N % of the final sample is 12.66 wt % and 24.56 wt %, respectively. The solid $^{31}$P NMR result of the sample is showed in FIG. 2. In $^{31}$P NMR spectrum, the peaks appeared around 49.2 ppm and −25.9 ppm, which should be attributed to presence of tertiary phosphine oxide and tertiary phosphine, respectively.

TGA Weight Loss Tests

TGA weight loss of the flame retardant samples was measured according to the procedure described above. Results are shown in Table 1 below:

TABLE 1

| | Example 1 | Example 2 | Example 3 | Comparative Example 1 |
|---|---|---|---|---|
| Weight loss | 2.17 wt % | 2.36 wt % | 1.69 wt % | 10.23 wt % |

It is shown that the inventive flame retardant exhibited reduced weight loss, indicating improved thermo stability.

Flame Retardant Performance Tests

In the following experiments, all compositions are processed on a microcompounder machine (DSM Xplore Micro compounders MC15) at a melt temperature of 280° C. and an injection temperature of 275° C. to obtain test specimens.

Test specimens were then used to determine the UL 94 fire classifications (Underwriter Laboratories) on specimens having thickness of 1.6 mm.

The UL 94 fire classifications are as follows:

V-0: afterflame time never longer than 10 secs, total of afterflame times for 10 flame applications not more than 50 secs, no flaming drops, no complete consumption of the specimen, afterglow time for specimens never longer than 30 secs after end of flame application V-1: afterflame time never longer than 30 secs after end of flame application, total of afterflame times for 10 flame application not more than 250 secs, afterglow time for specimens never longer than 60 secs after end of flame application, other criteria as for V-0 V-2: cotton indicator ignited by flaming drops, other criteria as for V-I Not classifiable (NR): does not comply with fire classifications V-2.

Results are shown in Tables 2 to 4 below:

TABLE 2

| Formulation | 1 | 2 | 3 |
|---|---|---|---|
| PA66-26A | 49.40% | 51.40% | 54.40% |
| Glass Fiber (301) | 30.00% | 30.00% | 30.00% |
| Irganox ® 1098 | 0.30% | 0.30% | 0.30% |
| LCA | 0.30% | 0.30% | 0.30% |
| THPS-MEA prepared in Example 1 | 20.00% | 18.00% | 15.00% |
| UL 94 classifications | V-0 | V-1 | NR |

The results in Table 2 demonstrated that the THPS-MEA flame retardant obtained by the inventive process has good flame retardant performance in polyamide.

TABLE 3

| Formulation | 4 | 5 | 6 |
|---|---|---|---|
| PA66-26A | 49.40% | 49.40% | 49.40% |
| Glass Fiber (301) | 30.00% | 30.00% | 30.00% |
| Irganox ® 1098 | 0.30% | 0.30% | 0.30% |
| LCA | 0.30% | 0.30% | 0.30% |
| THPS-MEA prepared in Example 1 | 15.00% | 15.00% | 15.00% |
| Exolit ® OP1230 | — | 5.00% | — |
| Amgard ® PA1 | 5.00% | — | — |
| $Al_2(HPO_3)_3$ | — | — | 5.00% |
| UL 94 classifications | V-0 | V-0 | V-1 |

The results in Table 3 showed that the inventive flame retardant provided good flame retardant performance when used in combination with other flame retardants in polyamide.

TABLE 4

| Formulation | 7 | 8 |
|---|---|---|
| PBT 1200-211M | 49.40% | 49.40% |
| Glass Fiber JUSHI 534A | 30.00% | 30.00% |
| Irganox ® 1098 | 0.30% | 0.30% |
| EBS | 0.30% | 0.30% |
| THPS-MEA prepared in Example 1 | 15.00% | 12.00% |
| Exolit ® OP1230 | 5.00% | 8.00% |
| UL 94 classifications | V-0 | V-0 |

The results in Table 4 showed that the inventive flame retardant exhibited excellent flame retardancy in glass fiber reinforced PBT.

The invention claimed is:

1. A process for preparing a flame retardant, the process comprising the steps of:
   (i) providing a reaction product of a Compound (N) with a Compound (P) in the absence of a catalyst;
   (ii) adding an oxidant to the reaction product in (i) and reacting the mixture to obtain the flame retardant;
   wherein:
   the Compound (N) is a compound according to general formula (I) or general formula (II):

$R_1$, $R_2$, and $R_3$ is independently hydrogen, hydroxyl, amino, or mono- or $diC_1$-$C_8$ alkyl amino; or $C_1$-$C_8$ alkyl, $C_5$-$C_{16}$ cycloalkyl, alkylcycloalkyl, each being optionally substituted by a hydroxyl or a $C_1$-$C_4$ hydroxyalkyl, $C_2$-$C_8$ alkenyl, $C_1$-$C_8$ alkoxyl, acyl, acyloxy, $C_6$-$C_{12}$ aryl, —$OR_1$ and —$N(R_1)R_2$; or is N-alicyclic or N-aromatic, where N-alicyclic denotes cyclic nitrogen containing compounds and N-aromatic denotes nitrogen containing heteroaromatic ring compounds; provided that at least one of $R_1$, $R_2$, and $R_3$ is an amino group, or a mono- or $diC_1$-$C_8$ alkyl amino group;

a and q is each independently 1, 2, 3 or 4;

X is an acid selected from the group consisting of phosphoric acid, pyrophosphoric acid, cyanuric acid and a $C_6$-$C_{12}$ aromatic carboxylic acid;

the Compound (P) is according to general formula (III):

$R_4$, $R_5$, $R_6$ and $R_7$ is independently a $C_1$-$C_5$ hydroxylalkyl;

Y is an anion, n is valence of Y.

2. The process of claim 1, wherein the Compound (N) is selected from the group consisting of melamine, melamine cyanurate, melamine phosphate compounds, dimelamine phosphate compounds, melamine pyrophosphate compounds, melem, melam, melon, ammeline, ammelide, and a mixture thereof.

3. The process of claim 1, wherein the compound (N) is melamine.

4. The process of claim 1, wherein the Compound (P) is according to general formula (IV):

wherein Y is an anion, n is valence of Y.

5. The process of claim 1, wherein Y is a halide anion, $SO_4^{2-}$, $NO_3^-$, $PO_4^{3-}$, $H_2PO_2^-$, $HPO_3^{2-}$, or $RCOOH^-$ wherein R is an alkyl, hydroxyalkyl, alkenyl or hydroxylalkenyl.

6. The process of claim 1, wherein Y is $Cl^-$, $Br^-$, $SO_4^{2-}$, $NO_3^-$, $PO_4^{3-}$, $H^2PO_2^-$, or $HPO_3^{2-}$.

7. The process of claim 1, wherein the Compound (P) is bis[tetrakis(hydroxymethyl)phosphonium]sulfate (THPS) or tetrakis(hydroxymethyl)phosphonium Chloride (THPC) or a mixture thereof.

8. The process of claim 1, wherein the molar ratio of the Compound (N) to the Compound (P) is from 1:5 to 5:1.

9. The process of claim 1, wherein in the step (ii), the oxidant is selected from $H_2O_2$, oxygen, a pyrosulfite salt, a persulphate salt, a peroxodisulfate salt and an organic peroxide.

* * * * *